(12) United States Patent
Wang et al.

(10) Patent No.: US 12,511,892 B2
(45) Date of Patent: Dec. 30, 2025

(54) FORMULA RECOGNITION METHOD AND APPARATUS

(71) Applicant: BEIJING SOGOU TECHNOLOGY DEVELOPMENT CO., LTD., Beijing (CN)

(72) Inventors: Jie Wang, Beijing (CN); Yingjun Wang, Beijing (CN); Bo Qin, Beijing (CN); Xiaozhe Xin, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 343 days.

(21) Appl. No.: 18/300,031

(22) Filed: Apr. 13, 2023

(65) Prior Publication Data

US 2023/0252778 A1 Aug. 10, 2023

Related U.S. Application Data

(63) Continuation of application No. PCT/CN2021/103569, filed on Jun. 30, 2021.

(30) Foreign Application Priority Data

Mar. 25, 2021 (CN) .......................... 202110322524.2

(51) Int. Cl.
*G06K 9/00* (2022.01)
*G06V 10/42* (2022.01)
*G06V 10/44* (2022.01)
*G06V 10/82* (2022.01)

(52) U.S. Cl.
CPC .............. *G06V 10/82* (2022.01); *G06V 10/42* (2022.01); *G06V 10/44* (2022.01)

(58) Field of Classification Search
None
See application file for complete search history.

(56) References Cited

U.S. PATENT DOCUMENTS

2017/0364744 A1\* 12/2017 Savchenkov .... G06V 30/19167
2020/0151424 A1 5/2020 Li et al.

FOREIGN PATENT DOCUMENTS

| CN | 106548145 A | 3/2017 |
| CN | 111046751 A | 4/2020 |
| CN | 111368773 A | 7/2020 |
| CN | 113033538 A | 6/2021 |

OTHER PUBLICATIONS

Zhang et al.. "Multi-scale attention with dense encoder for handwritten mathematical expression recognition" (Year: 2018).\*

(Continued)

*Primary Examiner* — S J Park
(74) *Attorney, Agent, or Firm* — Sughrue Mion, PLLC

(57) ABSTRACT

A formula recognition method and apparatus, a computer-readable medium, and an electronic device. The formula recognition method includes acquiring a target image including a formula, processing the target image to obtain a global image feature and a local image feature, and processing the global image feature and the local image feature to obtain the formula included in the target image.

18 Claims, 4 Drawing Sheets

(56) References Cited

OTHER PUBLICATIONS

Zhang et al., "Watch, attend and parse: an end-to-end neural network based approach to handwritten mathematical expression recognition" (Year: 2017).*

Zhang et al., "A GRU-based encoder-decoder approach with attention for online handwritten mathematical expression recognition" (Year: 2017).*

Wang et al., "Image to LaTeX with DenseNet encoder and joint attention" (Year: 2019).*

Wang et al., "Multi-modal attention for handwritten mathematical expression recognition" (Year: 2019).*

International Search Report for PCT/CN2021/103569 dated Dec. 8, 2021 (PCT/ISA/210).

Written Opinion for PCT/CN2021/103569 dated Dec. 8, 2021 (PCT/ISA/237).

* cited by examiner

FORMULA RECOGNITION METHOD AND APPARATUS

CROSS-REFERENCE TO RELATED APPLICATION(S)

This application is a continuation application of International Application No. PCT/CN2021/103569, filed on Jun. 30, 2021, which claims priority to Chinese Patent Application No. 202110322524.2, filed with the China National Intellectual Property Administration on Mar. 25, 2021, the disclosures of which are incorporated herein by reference in their entireties.

FIELD

The disclosure relates to the field of data processing, and in particular, to a formula recognition method and apparatus.

BACKGROUND

In the field of data processing, a formula in an image needs to be recognized; however, the currently used formula recognition method cannot accurately recognize a formula in an image. Therefore, a solution is urgently required to resolve this problem.

SUMMARY

Some embodiments provide a formula recognition method, including: acquiring a target image including a formula to be recognized; processing the target image to obtain a global image feature and a local image feature; and processing the global image feature and the local image feature to obtain the formula included in the target image.

In some embodiments, the processing the target image to obtain a global image feature and a local image feature includes: using M convolutional layers and N pooling layers of a convolutional neural network to process the target image to obtain the global image feature, where both M and N are integers greater than or equal to 1; and using the M convolutional layers and some of the N pooling layers to process the target image to obtain the local image feature.

In some embodiments, the convolutional neural network is: a DenseNet.

In some embodiments, the processing the global image feature and the local image feature to obtain the formula included in the target image is implemented by a decoder, and the decoder includes: a first gate recurrent unit (GRU) layer and a second GRU layer, where: at a first decoding moment: input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further includes: a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder is a decoder in a Transformer model.

In some embodiments, the acquiring a target image including a formula includes: acquiring an original image including a formula, and removing redundant information and/or noise interference in the original image to obtain the target image.

In some embodiments, the method may further include: acquiring a training image including a formula; and using the training image and annotation information of the training image to obtain a formula recognition model through training, where the annotation information of the training image is used for indicating the formula included in the training image and the formula recognition model is configured to recognize the formula in the target image.

Some embodiments provide a formula recognition apparatus, including: at least one memory configured to store program code; and at least one processor configured to read the program code and operate as instructed by the program code, the program code including: a first acquisition unit, configured to acquire a target image including a formula to be recognized; a first processing unit, configured to process the target image to obtain a global image feature and a local image feature; and a second processing unit, configured to process the global image feature and the local image feature to obtain the formula included in the target image.

In some embodiments, the first processing unit may be configured to: use M convolutional layers and N pooling layers of a convolutional neural network to process the target image to obtain the global image feature, where both M and N are integers greater than or equal to 1; and use the M convolutional layers and some of the N pooling layers to process the target image to obtain the local image feature.

In some embodiments, the convolutional neural network is: a DenseNet.

In some embodiments, the second processing unit may be implemented by a decoder, and the decoder includes: a first gate recurrent unit (GRU) layer and a second GRU layer, where: at a first decoding moment: input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include: a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder may be a decoder in a Transformer model.

In some embodiments, the first acquisition unit may be configured to: acquire an original image including a formula, removing redundant information and/or noise interference in the original image to obtain the target image.

In some embodiments, the apparatus may further include: a second acquisition unit, configured to acquire a training image including a formula; and a training unit, configured to use the training image and annotation information of the training image to obtain a formula recognition model through training, where the annotation information of the training image is used for indicating the formula included in the training image and the formula recognition model is configured to recognize the formula in the target image.

Some embodiments may provide a formula recognition apparatus, including a memory and one or more programs, the one or more programs being stored in the memory and configured to be executed by one or more processors, and the one or more programs including instructions used for performing the following operations: acquiring a target image including a formula; processing the target image to obtain a global image feature and a local image feature; and processing the global image feature and the local image feature to obtain the formula included in the target image.

In some embodiments, the processing the target image to obtain a global image feature and a local image feature includes: using M convolutional layers and N pooling layers of a convolutional neural network to process the target image to obtain the global image feature, where both M and N are integers greater than or equal to 1; and using the M convolutional layers and some of the N pooling layers to process the target image to obtain the local image feature.

In some embodiments, the convolutional neural network may be: a DenseNet.

In some embodiments, the processing the global image feature and the local image feature to obtain the formula included in the target image is implemented by a decoder, and the decoder may include: a first gate recurrent unit (GRU) layer and a second GRU layer, where: at a first decoding moment: input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include: a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder may be a decoder in a Transformer model.

In some embodiments, the acquiring a target image including a formula may include: acquiring an original image including a formula, removing redundant information and/or noise interference in the original image to obtain the target image.

In some embodiments, the operations may further include: acquiring a training image including a formula; and using the training image and annotation information of the training image to obtain a formula recognition model through training, where the annotation information of the training image is used for indicating the formula included in the training image and the formula recognition model is configured to recognize the formula in the target image.

Some embodiments may provide a computer-readable storage medium, storing instructions, the instructions, when executed by one or more processors, causing an apparatus to perform the method according to any implementation in the first aspect.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Embodiments of the disclosure may provide a formula recognition method performed by a first device. The first device may acquire a target image including a formula, and then process the target image to obtain a global image feature and a local image feature. Further, the global image feature and the local image feature may be processed to obtain the formula included in the target image. It can be seen that, in some embodiments, the formula in the target image is recognized in combination with the local image feature of the target image. Therefore, even if characters included in the formula in the target image are relatively small, the formula in the target image can be accurately recognized by using the solution in some embodiments. Therefore, the formula in the target image can be accurately recognized by using the solution A formula in an image can be recognized by using a convolutional neural network. However, pooling layers in the convolutional neural network reduce resolution of the image when processing the image. Therefore, in a case that resolution of characters in the image is relatively low, for example, some characters in the formula handwritten by a user are relatively small, after the image is processed by the pooling layers, features of the characters cannot be extracted well, resulting in an inaccurate recognition result.

Embodiments of the disclosure provide a formula recognition method, which can accurately recognize a formula in a target image even if resolution of characters included in the formula in the target image is relatively low.

Figure 1:
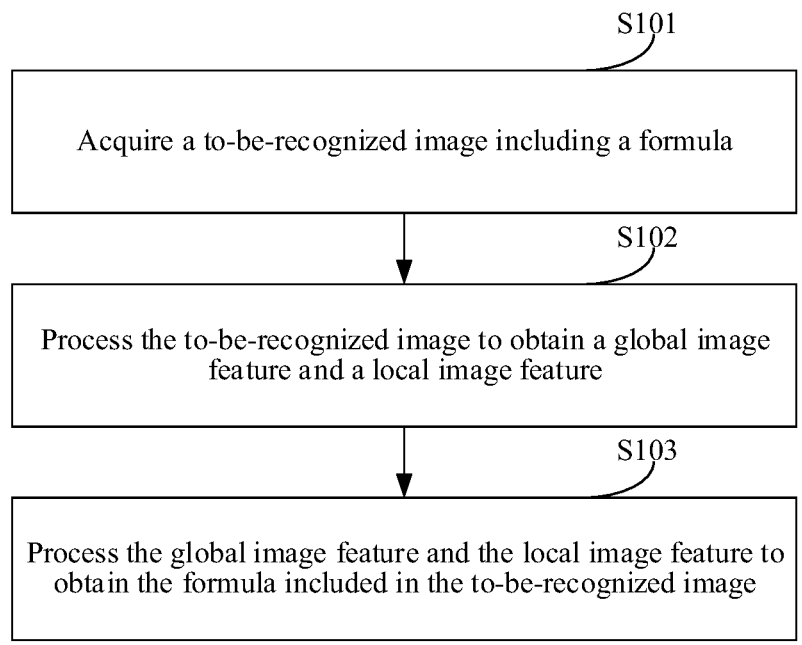
FIG. 1 is a schematic flowchart of a formula recognition method according to some embodiments.

FIG. 1 is a schematic flowchart of a formula recognition method according to some embodiments.

The method shown in FIG. 1, for example, may be performed by a first device, and the first device mentioned herein includes but is not limited to a terminal device and a server. The terminal device may be, for example, a desktop computer, or may be a mobile terminal such as a smartphone.

In some embodiments, the method, for example, may include the following operations: S101 to S103.

S101: Acquire a target image including a formula to be recognized.

The target image, also referred to as a to-be-recognized image, mentioned herein may be an image photographed by an image photographing device. The formula included in the target image mentioned herein may be handwritten or printed, which is not limited herein.

In some embodiments, the image photographed by the image photographing device may include redundant information such as a photographing background and/or noise interference, and the redundant information and the noise interference in the image affect accuracy of formula recognition. In some embodiments, an original image including a formula may be acquired first, and then redundant information and/or noise interference in the original image may be removed to obtain the target image. The original image mentioned herein may be, in some embodiments, an image that is photographed by an image photographing device and has not undergone image processing. The process of removing redundant information and/or noise interference in the original image may be considered as preprocessing the original image. The manner for preprocessing the original image is not limited thereto.

In some embodiments, preprocessing the original image may be performing one or more operations of equalization, cropping, color processing, rotation, brightness adjustment, and contrast adjustment on the original image, or the like. The preprocessing of the original image can remove the redundant information and/or the noise interference in the original image as much as possible, so that the formula in the original image can be more easily recognized.

S102: Process the target image to obtain a global image feature and a local image feature.

In some embodiments, after the target image is acquired, an image processing technology may be used to process the target image to obtain the global image feature and the local image feature.

In some embodiments, a convolutional neural network may be used to process the target image. In some embodiments, image features obtained by processing the target image by the convolutional neural network include multi-scale image features, including both a global image feature and a local image feature. The global image feature may be represented as a global feature vector, and the local image feature may be represented as a local feature vector. Because the convolutional neural network can obtain the local image feature, even if characters included in the formula in the target image are relatively small, image features of an image region in which the characters are located can be retained well by using the convolutional neural network. Correspondingly, the formula in the target image can be recognized in combination with the global image feature and the local image feature to accurately recognize the formula in the target image.

In some embodiments, the convolutional neural network includes M convolutional layers and N pooling layers, where both M and N are integers greater than or equal to 1. The M convolutional layers and the N pooling layers are configured to process the target image to obtain the global image feature, and the M convolutional layers and some of the N pooling layers are configured to process the target image to obtain the local image feature. It can be understood that since the pooling layers reduce feature resolution when processing the target image, using the M convolutional layers and some of the N pooling layers to perform processing can retain higher feature resolution to obtain the local image feature.

In some embodiments, M and N may be the same such that the convolutional neural network includes M convolutional layers and M pooling layers. In addition, when M is greater than or equal to 2, M convolutional layers and (M−1) pooling layers are used to process the target image to obtain the local image feature. For example, when M is equal to 5, 5 convolutional layers and 5 pooling layers are used to process the target image to obtain the global image feature, and 5 convolutional layers and 4 pooling layers are used to process the target image to obtain the local image feature.

Figure 2:
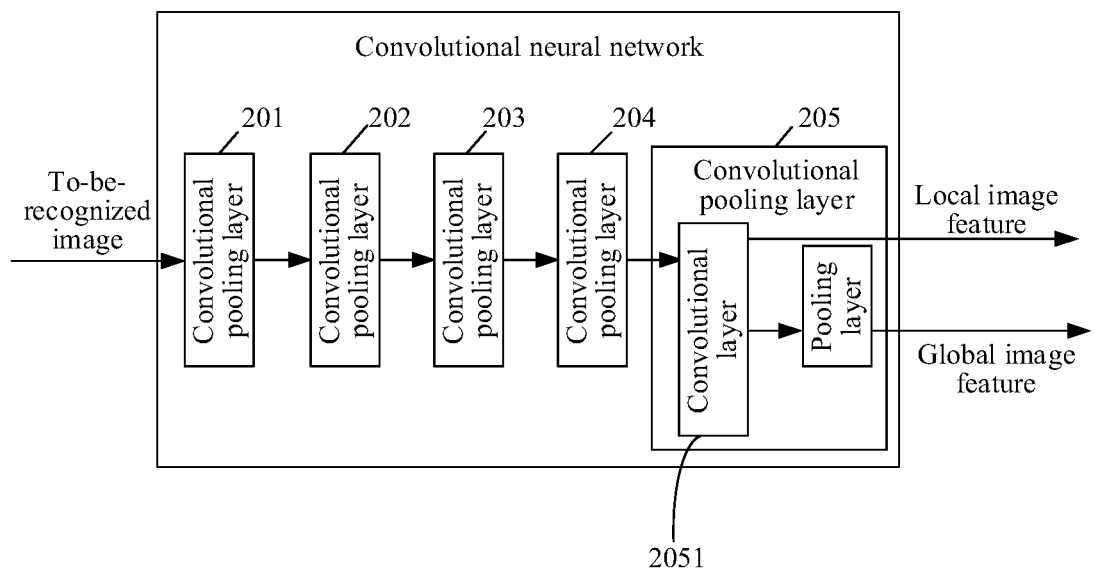
FIG. 2 is a schematic diagram of a convolutional neural network according to some embodiments.

In some embodiments, one convolutional layer and one pooling layer may form one convolutional pooling layer. FIG. 2 shows a schematic diagram of a convolutional neural network according to some embodiments. As shown in FIG. 2, the convolutional neural network includes convolutional pooling layers 201, 202, 203, 204, and 205. Input of the convolutional pooling layer 201 is a target image, output of the convolutional pooling layer 201 is input of the convolutional pooling layer 202, output of the convolutional pooling layer 202 is input of the convolutional pooling layer 203, output of the convolutional pooling layer 203 is input of the convolutional pooling layer 204, output of the convolutional pooling layer 204 is input of the convolutional pooling layer 205, a convolutional layer 2051 in the convolutional pooling layer 205 outputs a local image feature, and the convolutional pooling layer 205 outputs a global image feature. The embodiments are not limited thereto In some embodiments, considering that a DenseNet enhances feature extraction and facilitates gradient propagation, the convolutional neural network may be a DenseNet.

S103: Process the global image feature and the local image feature to obtain the formula included in the target image.

In some embodiments, after the global image feature and the local image feature are acquired, an image processing technology may be used to process the global image feature and the local image feature to obtain the formula included in the target image.

In some embodiments, a decoder may be used to process the global image feature and the local image feature to obtain the formula included in the target image.

The decoder is not limited herein. In some embodiments, the decoder may a decoder in a Transformer model.

In some embodiments, the decoder may include: a first gate recurrent unit (GRU) layer and a second GRU layer.

The global image feature and the local image feature outputted by the convolutional neural network are also used as input of the first GRU layer and the second GRU layer. A hidden vector obtained by the first GRU layer by processing the global image feature and the local image feature is also used as input of the second GRU layer.

In some embodiments, the first GRU layer may introduce a coverage attention mechanism so that the hidden vector obtained by the first GRU layer, in addition to carrying feature information, may further be configured to indicate undecoded content in the global image feature and the local image feature.

A decoding process of the decoder may be regarded as an iterative process.

Assuming that a second decoding moment is a previous decoding moment of a first decoding moment, at the first decoding moment, input of the first GRU layer may further include a hidden vector outputted by the first GRU layer at the second decoding moment. It can be understood that the hidden vector outputted by the first GRU layer at the second decoding moment can be configured to indicate the undecoded content in the global image feature and the local image feature at the first decoding moment. Therefore, during decoding at the first decoding moment, the first GRU layer can focus on the undecoded content in the global image feature and the local image feature according to the hidden vector outputted by the first GRU layer at the second decoding moment, and avoid repeated decoding on decoded content in the global image feature and the local image feature, thereby improving decoding efficiency.

In some embodiments, at the first decoding moment, input of the first GRU layer, in addition to including the foregoing global image feature, the local image feature, and a hidden vector outputted by the first GRU layer at the first decoding moment, may further include a hidden vector outputted by the second GRU layer at the second decoding moment.

In some embodiments, the second GRU layer may also introduce the coverage attention mechanism, so that the hidden vector obtained by the second GRU layer at the second decoding moment, in addition to carrying feature information, may further be configured to indicate the undecoded content in the global image feature and the local image feature at the first decoding moment. In this way, at the first decoding moment, the second GRU layer can determine the undecoded content in the global image feature and the local image feature at the first decoding moment according to the hidden vector obtained by the second GRU layer at the second decoding moment. Therefore, during decoding, the second GRU layer can focus on the undecoded content in the global image feature and the local image feature, and avoid repeated decoding on decoded content in the global image feature and the local image feature, thereby further improving decoding efficiency.

It can be understood that, at the last decoding moment, the second GRU layer can output a recognition result of the formula recognition model.

Figure 3:
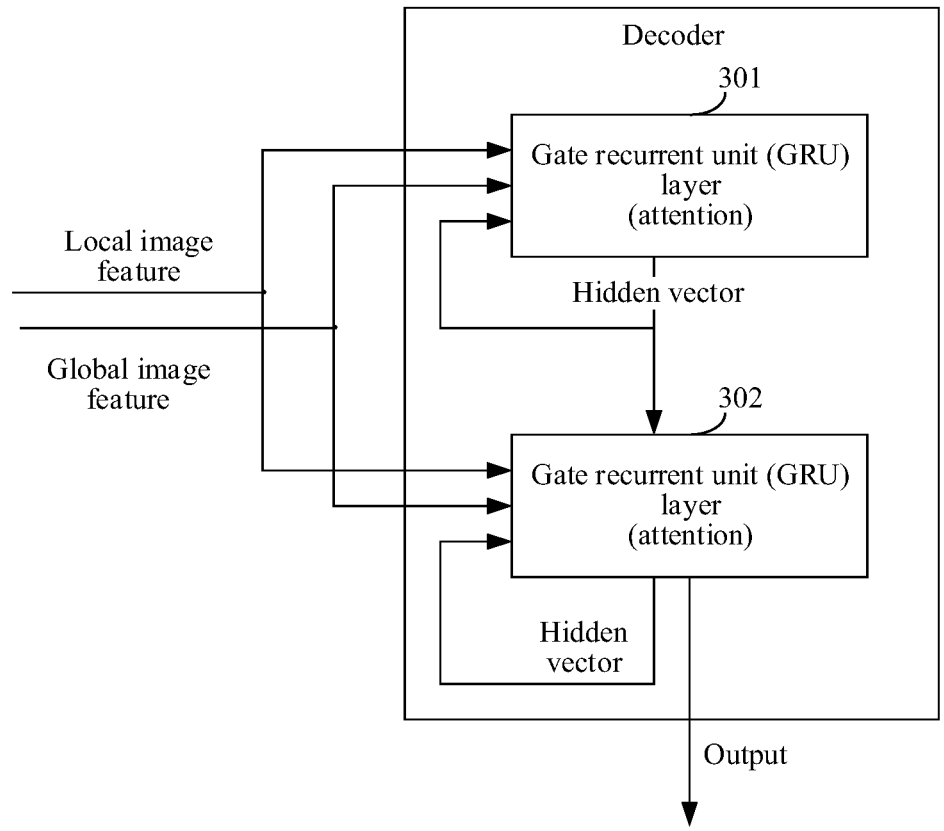
FIG. 3 is a schematic diagram of a decoder according to some embodiments.

FIG. 3 shows a schematic diagram of a decoder according to some embodiments. As shown in FIG. 3, the decoder includes a GRU layer 301 and a GRU layer 302. For input and output of the GRU layer 301 and input and output of the GRU layer 302, reference may be made to the foregoing descriptions, and details are not repeated herein again.

In some embodiments, after S103 is performed, formula text in a latex format may be obtained In some embodiments, the convolutional neural network and the decoder may form a formula recognition model, where the formula recognition model includes an encoder and a decoder. The encoder is represented as the convolutional neural network.

Therefore, in some embodiments, during operations S102 and S103, the target image may be inputted into the formula recognition model to obtain the formula included in the target image. The formula recognition model includes an encoder and a decoder, the encoder is configured to process the target image to obtain the global image feature and the local image feature, and the decoder is configured to process the global image feature and the local image feature to obtain the formula included in the target image.

The formula recognition model in some embodiments may include an encoder and a decoder. Input of the encoder is input of the formula recognition model, and output of the decoder is output of the formula recognition model. For example: the input of the encoder is the target image, and the encoder may process the target image to obtain image features of the target image. Output of the encoder is used as input of the decoder, and the decoder processes the image features outputted by the encoder to obtain the formula in target image.

For the encoder and the decoder, reference may be made to the foregoing descriptions, which are not repeated herein again.

In some embodiments, the formula recognition model may be obtained through pre-training.

In some embodiments, a training image including a formula may be acquired, and the formula in the training image may be annotated, that is: annotation information is added to the training image, where the annotation information is used for indicating the formula included in the training image. During annotation of the training image, various types of characters included in the formula may be annotated, for example, an operator and an operand in the formula may be annotated. The annotation information of the training image mentioned herein, for example, may be a character string in a latex format.

After the training image is annotated, model training may be performed according to the training image and the annotation information of the training image to obtain the formula recognition model. In some embodiments, during training of the formula recognition model, training samples may also be divided into a training set and a verification set, and training is performed based on the training samples included in the training set, and accuracy of a model recognition formula obtained through training is verified based on the training samples in the verification set. When the accuracy is higher than a certain threshold such as 95%, the training is stopped.

In some embodiments, the model training effect can be affected to some extent. Generally, more training samples indicate higher recognition accuracy of the formula recognition model obtained through training. In some embodiments, for one training image, corresponding processing may be performed on the training image to obtain more training samples. For example: one or more operations of rotation, noise addition, brightness adjustment, contrast adjustment, font color adjustment in the formula, image background adjustment, and distortion may be performed on a first training image, to obtain a plurality of training samples. It can be understood that preprocessing of data enhancement on the first training image can increase diversity and robustness of a sample image, so that for an image with various backgrounds and an image with a lot of interference information, the formula recognition model obtained through training can also more easily recognize formulas included in the images.

Figure 4:
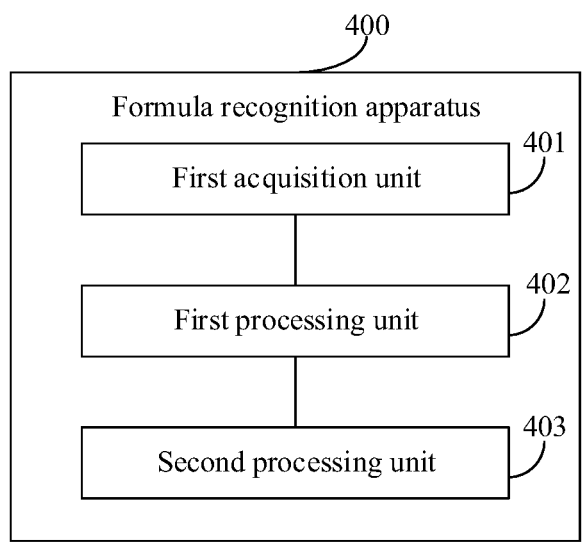
FIG. 4 is a schematic structural diagram of a formula recognition apparatus according to some embodiments.

FIG. 4 shows a schematic structural diagram of a formula recognition apparatus according to some embodiments. The apparatus 400 may include: a first acquisition unit 401, a first processing unit 402, and a second processing unit 403.

The first acquisition unit 401 is configured to acquire a target image including a formula.

The first processing unit 402 is configured to process the target image to obtain a global image feature and a local image feature.

The second processing unit 403 is configured to process the global image feature and the local image feature to obtain the formula included in the target image.

In some embodiments, the first processing unit 402 may be configured to:

use M convolutional layers and N pooling layers of a convolutional neural network to process the target image to obtain the global image feature, where both M and N are integers greater than or equal to 1; and use the M convolutional layers and some of the N pooling layers to process the target image to obtain the local image feature.

In some embodiments, the convolutional neural network is: a DenseNet.

In some embodiments, the second processing unit 403 is implemented by a decoder, and the decoder includes: a first gate recurrent unit (GRU) layer and a second GRU layer, where:

at a first decoding moment:

input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include:

a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder is a decoder in a Transformer model.

In some embodiments, the first acquisition unit 401 may be configured to:

acquire an original image including a formula, removing redundant information and/or noise interference in the original image to obtain the target image.

In some embodiments, the apparatus may further include:

a second acquisition unit, configured to acquire a training image including a formula;

and a training unit, configured to use the training image and annotation information of the training image to obtain a formula recognition model through training, where the annotation information of the training image is used for indicating the formula included in the training image and the formula recognition model is configured to recognize the formula in the target image.

The apparatus 400 is an apparatus corresponding to the method provided in the foregoing method embodiments, the specific implementation of the units of the apparatus 400 is of the same concept as the foregoing method embodiment. Therefore, for specific implementation of the units of the apparatus 400, reference may be made to the descriptions of the foregoing method embodiment, and details are not repeated herein again.

The method provided in some embodiments may be performed by a client or a server.

Figure 5:
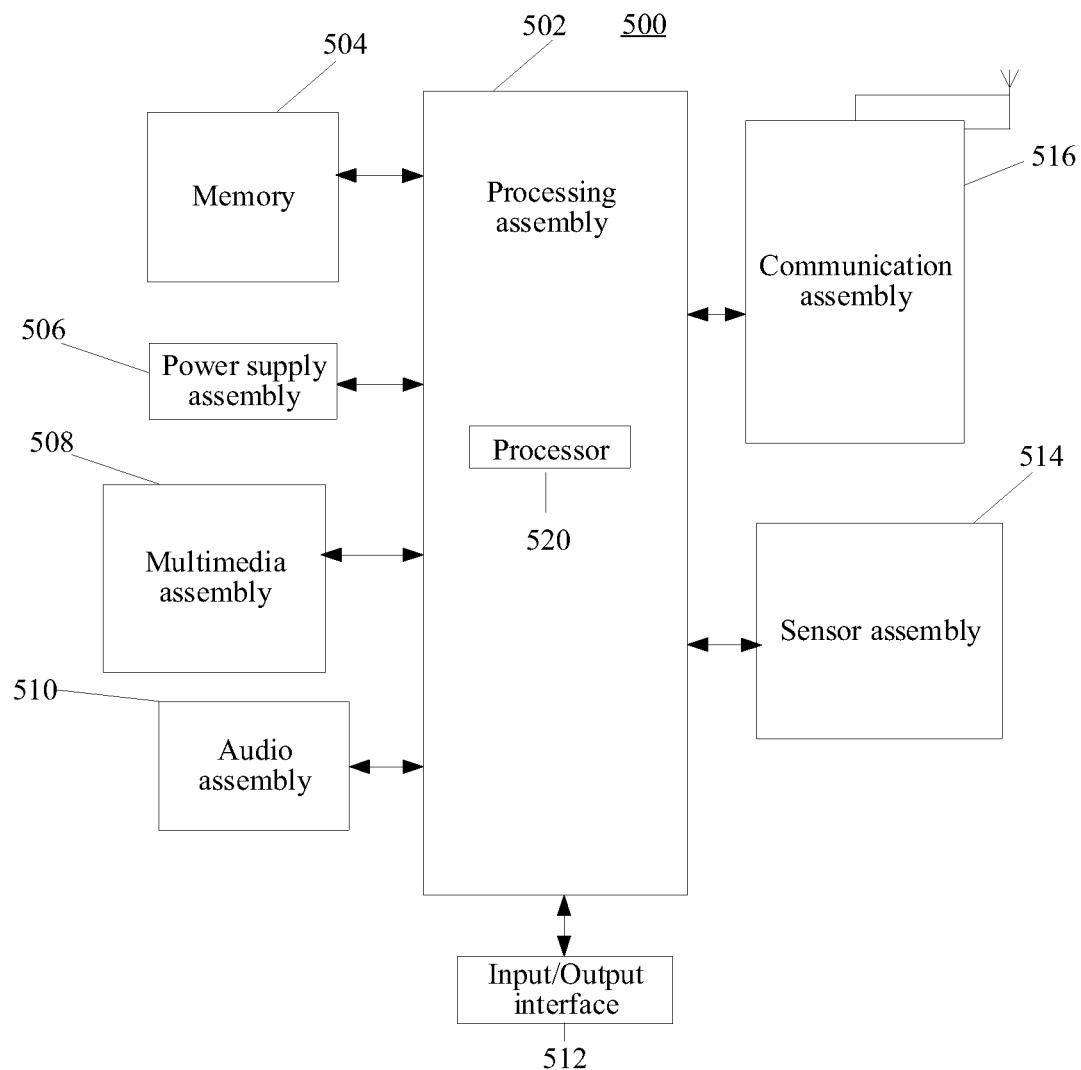
FIG. 5 is a schematic structural diagram of a client according to some embodiments.

FIG. 5 shows a block diagram of a client 500 according to some embodiments. In some embodiments, the client 500 may be a mobile phone, a computer, a digital broadcasting terminal, a messaging device, a game console, a tablet device, a medical device, a fitness facility, a personal digital assistant, or the like.

The client 500 may include one or more of the following assemblies: a processing assembly 502, a memory 504, a power supply assembly 506, a multimedia assembly 508, an audio assembly 510, an input/output (I/O) interface 512, a sensor assembly 514, and a communication assembly 516.

The processing assembly 502 may control integral operations of the client 500, such as operations related to displaying, a phone call, data communication, a camera operation, and a record operation. The processing assembly 502 may include one or more processors 520 to execute instructions, to complete all or some operations of the foregoing methods. In some embodiments, the processing assembly 502 may include one or more modules, to facilitate the interaction between the processing assembly 502 and another assembly. In some embodiments, the processing assembly 502 may include a multimedia module, to facilitate the interaction between the multimedia assembly 508 and the processing assembly 502.

The memory 504 is configured to store data of various types to support operations on the client 500. Examples of the data include instructions of any application program or method that are used for operations on the client 500, such as contact data, address book data, a message, a picture, and a video. The memory 504 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

The power supply assembly 506 provides power to various assemblies of the client 500. The power supply assembly 506 may include a power supply management system, one or more power supplies, and other assemblies associated with generating, managing, and allocating power for the client 500.

The multimedia assembly 508 includes a screen providing an output interface between the client 500 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and a gesture on the TP. The touch sensor may not only sense boundary of touching or sliding operations, but also detect duration and pressure related to the touching or sliding operations. In some embodiments, the multimedia assembly

508 includes a front-facing camera and/or a rear-facing camera. When the client 500 is in an operating mode, such as a photographing mode or a video mode, the front-facing camera and/or the rear-facing camera may receive external multimedia data. Each front-facing camera and rear-facing camera may be a fixed optical lens system or have a focal length and an optical zooming capability.

The audio assembly 510 is configured to output and/or input an audio signal. For example, the audio assembly 510 includes a microphone (MIC). When the client 500 is in the operating mode, such as a call mode, a record mode, and a speech recognition mode, the MIC is configured to receive an external audio signal. The received audio signal may be further stored in the memory 504 or transmitted through the communication assembly 516. In some embodiments, the audio assembly 510 may further include a loudspeaker, configured to output the audio signal.

The I/O interface provides an interface between the processing assembly 502 and an external interface module. The external interface module may be a keyboard, a click wheel, buttons, or the like. These buttons may include but are not limited to: a homepage button, a volume button, a start-up button, and a locking button.

The sensor assembly 514 includes one or more sensors, configured to provide state evaluation in each aspect to the client 500. For example, the sensor assembly 514 may detect a powered-on/off state of the client 500 and relative positioning of assemblies. For example, the assemblies are a display and a keypad of the client 500. The sensor assembly 514 may further detect a position change of the client 500 or an assembly of the client 500, existence or nonexistence of contact between the user and the client 500, an azimuth or acceleration/deceleration of the client 500, and a temperature change of the client 500. The sensor assembly 514 may include a proximity sensor, configured to detect existence of nearby objects without any physical contact. The sensor assembly 514 may further include an optical sensor, such as a CMOS or CCD image sensor, that is used in an imaging application. In some embodiments, the sensor assembly 514 may further include an acceleration sensor, a gyroscope sensor, a magnetic sensor, a pressure sensor, or a temperature sensor.

The communication assembly 516 is configured to facilitate communication in a wired or wireless manner between the client 500 and other devices. The client 500 may access a communication standard-based wireless network, such as WiFi, 2G, or 5G, or a combination thereof. In some embodiments, the communication assembly 516 receives a broadcast signal or broadcast related information from an external broadcast management system through a broadcast channel. In an exemplary embodiment, the communication assembly 516 further includes a near field communication (NFC) module, to promote short range communication. For example, the NFC module may be implemented based on a radio frequency identification (RFID) technology, an infrared data association (IrDA) technology, an ultra wideband (UWB) technology, a Bluetooth (BT) technology, and other technologies.

In some embodiments, the client 500 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, to perform the following method:
acquiring a target image including a formula;
processing the target image to obtain a global image feature and a local image feature; and
processing the global image feature and the local image feature to obtain the formula included in the target image.

In some embodiments, the processing the target image to obtain a global image feature and a local image feature includes:
using M convolutional layers and N pooling layers of a convolutional neural network to process the target image to obtain the global image feature, where both M and N are integers greater than or equal to 1; and using the M convolutional layers and some of the N pooling layers to process the to-be-recognized image to obtain the local image feature.

In some embodiments, the convolutional neural network is: a DenseNet.

In some embodiments, the processing the global image feature and the local image feature to obtain the formula included in the target image is implemented by a decoder, and the decoder includes: a first gate recurrent unit (GRU) layer and a second GRU layer, where:
at a first decoding moment:
input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include:
a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder is a decoder in a Transformer model.

In some embodiments, the acquiring a target image including a formula may include:
acquiring an original image including a formula, removing redundant information and/or noise interference in the original image to obtain the target image.

In some embodiments, the method may further include:
acquiring a training image including a formula; and
using the training image and annotation information of the training image to obtain a formula recognition model through training, where the annotation information of the training image is used for indicating the formula included in the training image and the formula recognition model is configured to recognize the formula in the target image.

Figure 6:
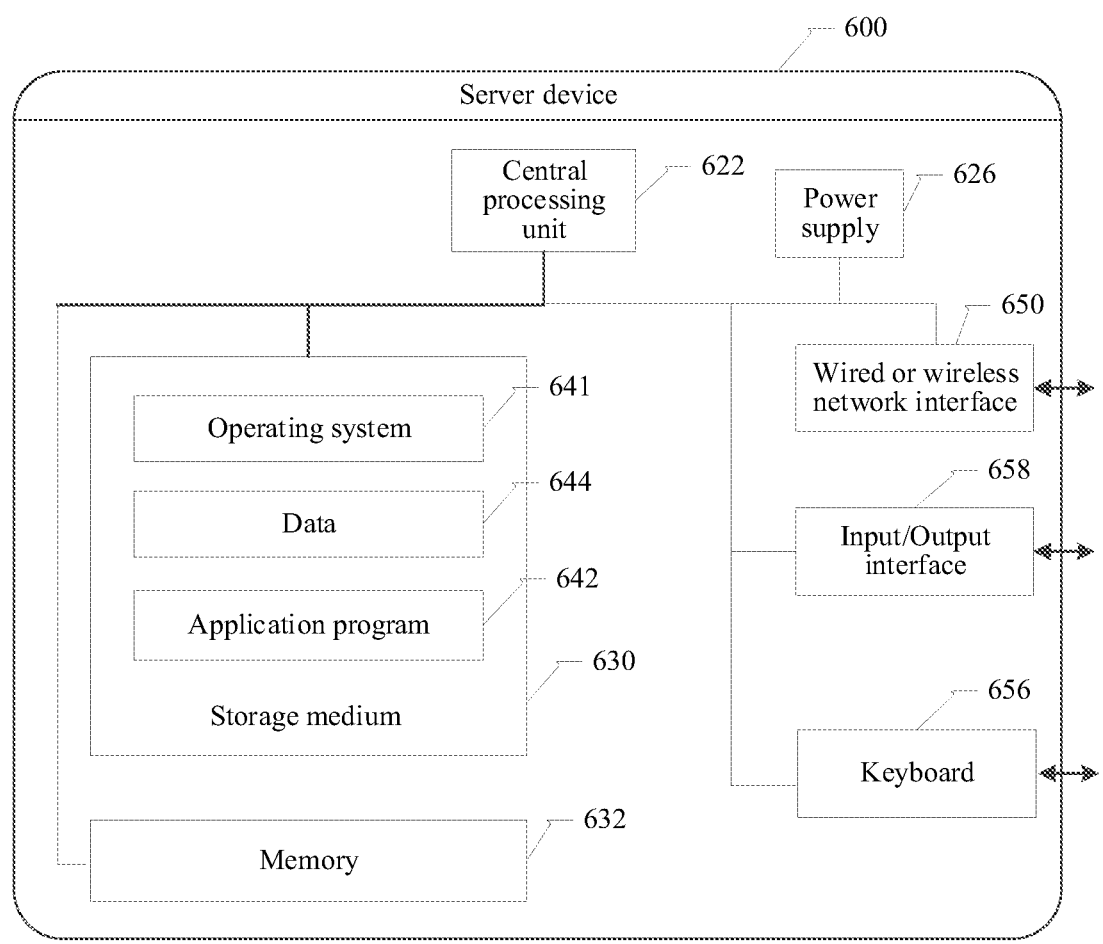
FIG. 6 is a schematic structural diagram of a server according to some embodiments.

FIG. 6 shows a schematic structural diagram of a server according to some embodiments. The server 600 may vary greatly due to different configurations or performance, and may include one or more central processing units (CPU) 622 (for example, one or more processors) and memories 632, and one or more storage media 630 (for example, one or more mass storage devices) storing an application program 642 or data 644. The memory 632 and the storage medium 630 may be transient or persistent storages. The application program 642 stored in the storage medium 630 may include one or more modules (not marked in the figure), and each module may include a series of instruction operations to the server. Further, the CPU 622 may be configured to communicate with the storage medium 630, and perform, on the server 600, the series of instruction operations in the storage medium 630.

Further, in some embodiments, the CPU 422 may perform the following method:

acquiring a target image including a formula;

processing the target image to obtain a global image feature and a local image feature; and processing the global image feature and the local image feature to obtain the formula included in the target image.

In some embodiments, the processing the target image to obtain a global image feature and a local image feature includes:

using M convolutional layers and N pooling layers of a convolutional neural network to process the target image to obtain the global image feature, where both M and N are integers greater than or equal to 1; and using the M convolutional layers and some of the N pooling layers to process the target image to obtain the local image feature.

In some embodiments, the convolutional neural network is: a DenseNet.

In some embodiments, the processing the global image feature and the local image feature to obtain the formula included in the target image is implemented by a decoder, and the decoder includes: a first gate recurrent unit (GRU) layer and a second GRU layer, where:

at a first decoding moment:

input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include:

a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder is a decoder in a Transformer model.

In some embodiments, the acquiring a target image including a formula may include:

acquiring an original image including a formula, removing redundant information and/or noise interference in the original image to obtain the target image.

In some embodiments, the method may further include:

acquiring a training image including a formula; and using the training image and annotation information of the training image to obtain a formula recognition model through training, where the annotation information of the training image is used for indicating the formula included in the training image and the formula recognition model is configured to recognize the formula in the target image.

The server 600 may further include one or more power supplies 626, one or more wired or wireless network interfaces 650, one or more input/output interfaces 658, one or more keyboards 656, and/or, one or more operating systems 641, for example, Windows Server™, Mac OS X™, Unix™, Linux™, and FreeBSD™.

A person skilled in the art would understand that these "units" could be implemented by hardware logic, a processor or processors executing computer software code, or a combination of both.

Some embodiments may further provide a non-transitory computer-readable storage medium. When instructions in the storage medium are executed by a processor of an electronic device, the electronic device is caused to perform a formula recognition method, including:

acquiring a target image including a formula;

processing the target image to obtain a global image feature and a local image feature; and processing the global image feature and the local image feature to obtain the formula included in the target image.

In some embodiments, the processing the target image to obtain a global image feature and a local image feature includes:

using M convolutional layers and N pooling layers of a convolutional neural network to process the target image to obtain the global image feature, where both M and N are integers greater than or equal to 1; and using the M convolutional layers and some of the N pooling layers to process the target image to obtain the local image feature.

In some embodiments, the convolutional neural network is: a DenseNet.

In some embodiments, the processing the global image feature and the local image feature to obtain the formula included in the target image is implemented by a decoder, and the decoder includes: a first gate recurrent unit (GRU) layer and a second GRU layer, where:

at a first decoding moment:

input of the first GRU layer includes: the global image feature, the local image feature, and a hidden vector obtained by the first GRU layer at a second decoding moment, where the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer includes: the global image feature, the local image feature, and a hidden vector outputted by the first GRU layer at the first decoding moment; and output of the decoder is a decoding result obtained by the second GRU layer at the last decoding moment.

In some embodiments, at the first decoding moment, the input of the second GRU layer may further include:

a hidden vector obtained by the second GRU layer at the second decoding moment, where the hidden vector obtained by the second GRU layer at the second decoding moment indicates undecoded content in the global image feature and the local image feature at the first decoding moment.

In some embodiments, the decoder is a decoder in a Transformer model.

In some embodiments, the acquiring a target image including a formula includes:

acquiring an original image including a formula, removing redundant information and/or noise interference in the original image to obtain the target image.

In some embodiments, the method may further include:

acquiring a training image including a formula; and using the training image and annotation information of the training image to obtain a formula recognition model through training, where the annotation information of the training image is used for indicating the formula included in the training image and the formula recognition model is configured to recognize the formula in the target image.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A formula recognition method, performed by an electronic device, comprising:
   acquiring a target image comprising a formula to be recognized;
   processing the target image to obtain a global image feature and a local image feature, the global image feature representing a feature of the target image overall, and the local image feature representing a feature of a portion of the target image less than the target image overall; and
   processing the global image feature and the local image feature to obtain the formula comprised in target image,
   wherein the processing the global image feature and the local image feature is implemented by a decoder, and the decoder comprises: a first gate recurrent unit (GRU) layer and a second GRU layer, wherein,
   at a first decoding moment, input of the first GRU layer comprises: the global image feature, the local image feature, and a hidden vector obtained by the first GRU layer at a second decoding moment, wherein the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer comprises: the global image feature, the local image feature, and a hidden vector outputted by the first GRU layer at the first decoding moment; and
   output of the decoder is a decoding result obtained by the second GRU layer at the last decoding moment.

2. The formula recognition method according to claim 1, wherein the processing the target image comprises:
   using M convolutional layers and N pooling layers of a convolutional neural network to process the target image to obtain the global image feature, wherein both M and N are integers greater than or equal to 1; and
   using the M convolutional layers and at least one of the N pooling layers to process the target image to obtain the local image feature.

3. The formula recognition method according to claim 2, wherein the convolutional neural network is a DenseNet.

4. The formula recognition method according to claim 1, wherein at the first decoding moment, the input of the second GRU layer further comprises a second hidden vector obtained by the second GRU layer at the second decoding moment, wherein the hidden vector obtained by the second GRU layer at the second decoding moment indicates undecoded content in the global image feature and the local image feature at the first decoding moment.

5. The formula recognition method according to claim 1, wherein the decoder is a decoder in a Transformer model.

6. The formula recognition method according to claim 1, wherein the acquiring a target image comprises:
   acquiring an original image comprising the formula, and removing redundant information and/or noise interference in the original image to obtain the target image.

7. The formula recognition method according to claim 1, further comprising:
   acquiring a training image comprising a training formula; and
   using the training image and annotation information of the training image to obtain a formula recognition model through training, the annotation information of the training image indicating the training formula comprised in the training image and the formula recognition model is configured to recognize the formula in target image.

8. A formula recognition apparatus, comprising:
   at least one memory configured to store program code;
   at least one processor configured to read the program code and operate as instructed by the program code, the program code comprising:
   first acquisition code configured to cause the at least one processor to acquire a target image comprising a formula to be recognized;
   first processing code configured to cause the at least one processor to process the target image to obtain a global image feature and a local image feature, the global image feature representing a feature of the target image overall, and the local image feature representing a feature of a portion of the target image less than the target image overall;
   second processing code configured to cause the at least one processor to process the global image feature and the local image feature to obtain the formula comprised in the target image; and
   decoder code configured to cause the at least one processor to implement a first gate recurrent unit (GRU) layer and a second GRU layer, wherein,
   at a first decoding moment:
   input of the first GRU layer comprises: the global image feature, the local image feature, and a hidden vector obtained by the first GRU layer at a second decoding moment, wherein the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer comprises: the global image feature, the local image feature, and a hidden vector outputted by the first GRU layer at the first decoding moment; and
   output of the decoder is a decoding result obtained by the second GRU layer at the last decoding moment.

9. The formula recognition apparatus according to claim 8, wherein the first processing code is configured to cause the at least one processor to:
   use M convolutional layers and N pooling layers of a convolutional neural network to process the target image to obtain the global image feature, wherein both M and N are integers greater than or equal to 1; and use the M convolutional layers and at least one of the N pooling layers to process the target image to obtain the local image feature.

10. The formula recognition apparatus according to claim 9, wherein the convolutional neural network is a DenseNet.

11. The formula recognition apparatus according to claim 8, wherein at the first decoding moment, the input of the second GRU layer further comprises:

a hidden vector obtained by the second GRU layer at the second decoding moment, wherein the hidden vector obtained by the second GRU layer at the second decoding moment indicates undecoded content in the global image feature and the local image feature at the first decoding moment.

12. The formula recognition apparatus according to claim 8, wherein the decoder code is a decoder in a Transformer model.

13. The formula recognition apparatus according to claim 8, wherein the first acquisition code is further configured to cause the at least one processor to:

acquire an original image comprising the formula, removing redundant information and/or noise interference in the original image to obtain the target image.

14. The formula recognition apparatus according to claim 13, wherein the program code further comprises:

second acquisition code configured to cause the at least one processor to acquire a training image comprising a training formula; and training code configured to cause the at least one processor to use the training image and annotation information of the training image to obtain a formula recognition model through training, the annotation information of the training image indicating the training formula comprised in the training image and the formula recognition model is configured to recognize the formula in the target image.

15. A non-transitory computer-readable storage medium, storing computer code that when executed by at least one processor causes the at least one processor to:

acquire a target image comprising a formula;

process the target image to obtain a global image feature and a local image feature, the global image feature representing a feature of the target image overall, and the local image feature representing a feature of a portion of the target image less than the target image overall; and process the global image feature and the local image feature to obtain the formula comprised in target image, wherein the processing the global image feature and the local image feature is implemented by a decoder, and the decoder comprises: a first gate recurrent unit (GRU) layer and a second GRU layer, wherein, at a first decoding moment, input of the first GRU layer comprises: the global image feature, the local image feature, and a hidden vector obtained by the first GRU layer at a second decoding moment, wherein the second decoding moment is a previous decoding moment of the first decoding moment, and the hidden vector obtained by the first GRU layer at the second decoding moment indicates undecoded content in the global image feature and the local image feature at the first decoding moment; and input of the second GRU layer comprises: the global image feature, the local image feature, and a hidden vector outputted by the first GRU layer at the first decoding moment; and output of the decoder is a decoding result obtained by the second GRU layer at the last decoding moment.

16. The non-transitory computer-readable storage medium according to claim 15, wherein the process the target image comprises:

using M convolutional layers and N pooling layers of a convolutional neural network to process the target image to obtain the global image feature, wherein both M and N are integers greater than or equal to 1; and using the M convolutional layers and at least one of the N pooling layers to process the target image to obtain the local image feature.

17. The non-transitory computer-readable storage medium according to claim 15, wherein the acquire comprises:

acquiring an original image comprising the formula, and removing redundant information and/or noise interference in the original image to obtain the target image.

18. The non-transitory computer-readable storage medium according to claim 15, wherein the computer code further causes the at least one processor to:

acquire a training image comprising a training formula; and use the training image and annotation information of the training image to obtain a formula recognition model through training, the annotation information of the training image indicating the training formula comprised in the training image and the formula recognition model is configured to recognize the formula in target image.

* * * * *